United States Patent
Bharitkar et al.

(10) Patent No.: US 9,002,030 B2
(45) Date of Patent: Apr. 7, 2015

(54) SYSTEM AND METHOD FOR PERFORMING VOICE ACTIVITY DETECTION

(75) Inventors: Sunil Bharitkar, Los Angeles, CA (US); Nathan Dahlin, Los Angeles, CA (US)

(73) Assignee: Audyssey Laboratories, Inc., Los Angeles, CA (US)

(*) Notice: Subject to any disclaimer, the term of this patent is extended or adjusted under 35 U.S.C. 154(b) by 380 days.

(21) Appl. No.: 13/461,770

(22) Filed: May 1, 2012

(65) Prior Publication Data

US 2013/0294614 A1 Nov. 7, 2013

(51) Int. Cl.
*H04B 15/00* (2006.01)
*G10L 25/78* (2013.01)
*H04M 9/08* (2006.01)
*G10L 21/0232* (2013.01)

(52) U.S. Cl.
CPC ............ *G10L 25/78* (2013.01); *G10L 21/0232* (2013.01); *G10L 2025/786* (2013.01); *H04M 9/082* (2013.01)

(58) Field of Classification Search
CPC ............ H04R 3/00; H04B 15/00; H03G 3/20; G10L 21/00; G10L 15/00
USPC ........... 381/92, 94.1–94.8, 110; 704/226, 233
See application file for complete search history.

(56) References Cited

U.S. PATENT DOCUMENTS

| | | | |
|---|---|---|---|
| 4,359,604 A | 11/1982 | Dumont | |
| 5,732,141 A | 3/1998 | Chaoui et al. | |
| 6,148,078 A | 11/2000 | Romesburg | |
| 6,882,734 B2 | 4/2005 | Watson et al. | |
| 7,146,315 B2 | 12/2006 | Balan et al. | |
| 7,369,990 B2 * | 5/2008 | Nemer | 704/226 |
| 2003/0179888 A1 | 9/2003 | Burnett et al. | |
| 2007/0219791 A1 * | 9/2007 | Gao et al. | 704/233 |
| 2008/0019539 A1 | 1/2008 | Patel et al. | |
| 2010/0128881 A1 | 5/2010 | Petit et al. | |
| 2010/0128894 A1 | 5/2010 | Petit et al. | |
| 2011/0106533 A1 * | 5/2011 | Yu | 704/233 |

* cited by examiner

*Primary Examiner* — Disler Paul
(74) *Attorney, Agent, or Firm* — Kenneth L. Green

(57) ABSTRACT

A Voice Activity Detection (VAD) algorithm provides a simple binary signal indicating the presence or absence of speech in a microphone signal. The VAD algorithm includes a first step of noise suppression which both estimates and removes (i.e., filters) ambient noise from the microphone signal to create a filtered signal. The magnitude of the filtered signal is then compared to a threshold in order to produce a VAD output signal. The threshold is dynamic and may be derived either from the filtered signal itself, or from a noise spectrum estimate calculated by the noise suppression step.

9 Claims, 6 Drawing Sheets

SYSTEM AND METHOD FOR PERFORMING VOICE ACTIVITY DETECTION

BACKGROUND OF THE INVENTION

The present invention relates to processing microphone signals and in particular to determining when a microphone signal includes human speech.

Various types of processing are performed on microphone signals for different purposes. For example, there may be a desire to cut off a microphone signal being recorded when there is no voice content for recording economy. There also are instances where it is desirable to distinguish between background noise and a speaker's voice. Known methods fail to adequately identify the presence of voice content in a microphone signal in these and other instances.

BRIEF SUMMARY OF THE INVENTION

The present invention addresses the above and other needs by providing a Voice Activity Detection (VAD) algorithm which provides a simple binary signal indicating the presence or absence of speech in a microphone signal. The VAD algorithm includes a first step of noise suppression which both estimates and removes (i.e., filters) ambient noise from the microphone signal to create a filtered signal. The magnitude of the filtered signal is then compared to a threshold in order to produce a VAD output signal. The threshold is dynamic and may be derived either from the filtered signal itself, or from a noise spectrum estimate calculated by the noise suppression step.

In accordance with one aspect of the invention, there is provided a first step of noise suppression. A microphone signal is processed to estimate the noise spectrum and then the noise spectrum is subtracted from the total signal spectrum to suppress noise to provide an estimate of voice content. In a second step, the voice content estimate in compared to a threshold to provide voice activity detection.

In accordance with another aspect of the invention, there are provided two methods for determining the threshold. A first method uses a noise floor spectral density computed in the noise suppression step to compute the threshold and a second method uses a smoothed estimate of noise only obtained during non-speech periods to compute a threshold.

In accordance with yet another aspect of the invention, there is provided an initialization period. During the initialization period the VAD is set to 0 (non-speech) and an initial threshold is computed for subsequent processing.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
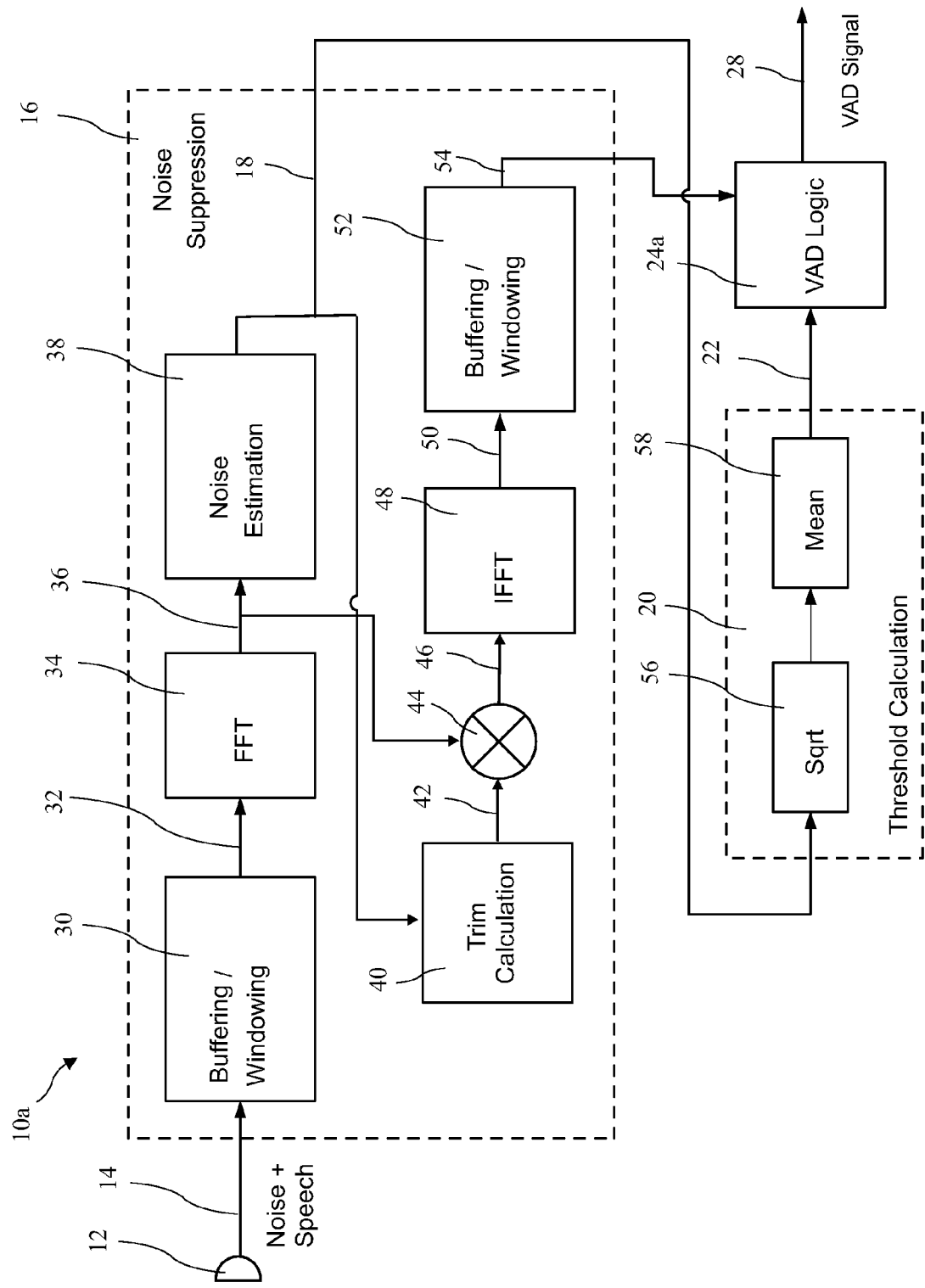
FIG. 1 shows a first embodiment of a Voice Activity Detection (VAD) method using a threshold based on noise floor spectral density according to the present invention.

A first embodiment of a Voice Activity Detection (VAD) method 10a using a threshold based on noise floor spectral density, according to the present invention is shown in FIG. 1. A microphone 12 produces a microphone signal 14 provided to noise suppression processing 16. The noise suppression processing 16 processes the microphone signal and generates ambient noise estimate frames 18 and a noise suppressed (i.e., ambient noise removed) signal 54. The ambient noise estimate frames 18 are provided to a threshold calculation 20 which calculates a threshold 22 provided to VAD logic 24a. The noise suppressed signal 54 is also provided to the VAD logic 24a. The VAD logic 24a compares the noise suppressed signal 54 to the threshold 22 and sets a VAD signal 28 to "0" when a voice is not present in the microphone signal 14, and sets a VAD signal 28 to "1" when a voice is present in the microphone signal 14.

The noise suppression processing 16 receives the microphone signal 14 and processes the microphone signal 14 in buffering/windowing 30 forming time domain frames 32. The time domain frames 32 are processed by FFT 34 generating microphone signal FFT frames 36. The microphone signal FFT frames 36 are processed sequentially by noise estimation 38 to generate the ambient noise estimate frames 18. The noise estimation 38 preferably uses the noise power spectral density estimation technique presented by Rainer Martin in "Noise Power Spectral Density Estimation Based on Optimal Smoothing and Minimum Statistics" IEEE Trans. Speech and Audio Processing, 9(5):504-512, July 2001. On a bin by bin bases, the technique keeps a running update of detected minima, incorporating minimum statistics in the final estimate in order to avoid underestimating the noise level. The noise estimation 38 preferably operates in the power domain.

The ambient noise estimate frames 18 are processed by trim calculation 40 to provide trims 42. The trims 42 are each applied to the corresponding bins of the FFT frames 36 to obtain filtered FFT frames 46, thus implementing spectral subtraction through bin scaling. The trims 42 are preferably calculated in trim calculation 40 according to a method set forth by Berouti in "Enhancement of Speech Corrupted by Acoustic Noise" Proc. IEEE ICASSP, 1979, 4, 208-211. Berouti's method is based upon spectral subtraction, where an estimated noise spectrum is subtracted from the spectrum of a corrupted signal containing content as well as noise. Berouti improved on this method by introducing an over subtraction factor, along with a noise floor factor where a scaled version of the noise estimate is subtracted from the corrupted signal, on a bin by bin basis. If the resulting bin value falls below the noise floor value, the bin is simply scaled by the noise floor value, otherwise, the original result of subtracting the scaled version of the noise estimate is kept. The subtraction factor is further altered to vary with estimated signal to noise ratio. The over subtraction factor sets an upper limit for the scale factor and governs changes in the scale factor with signal to noise ratio. The spectral subtraction is performed by multiplication of the trims 42 times the corresponding bins of the FFT frames 36, thus scaling the FFT frames 36 to values equivalent to those obtained by subtraction.

The filtered FFT frames 46 are processed by IFFT 48 to generate filtered time domain frames 50. The filtered time domain frames 52 are processed by buffering/windowing 52 to generate a filtered time domain (i.e., the noise suppressed signal) sequence 54. The buffering/windowing 52 includes overlapping and adding consecutive frames.

The ambient noise estimate frames 18 are preferably updated at between five and 64 ms and more preferably every 64 ms, and the scale factor is preferably set to between three and 100 and more preferably to about 100, meaning that noise peaks up to about 20 dB above the noise estimate will be attenuated. The suppression effectively isolates and emphasizes speech components so that they can be more consistently identified with an overall threshold.

The ambient noise estimate frames 18 are also processed by threshold calculation 20, taking the square root 56 and the mean 58 of each FFT bin to generate a threshold 22. The noise suppressed signal 54 is compared to the threshold 22, and when the noise suppressed signal 54 exceeds the threshold 22, the VAD signal is set to "1" for voice present and when the noise suppressed signal 54 does not exceed the threshold 22, the VAD signal is set to "0" for voice absent.

Figure 2:
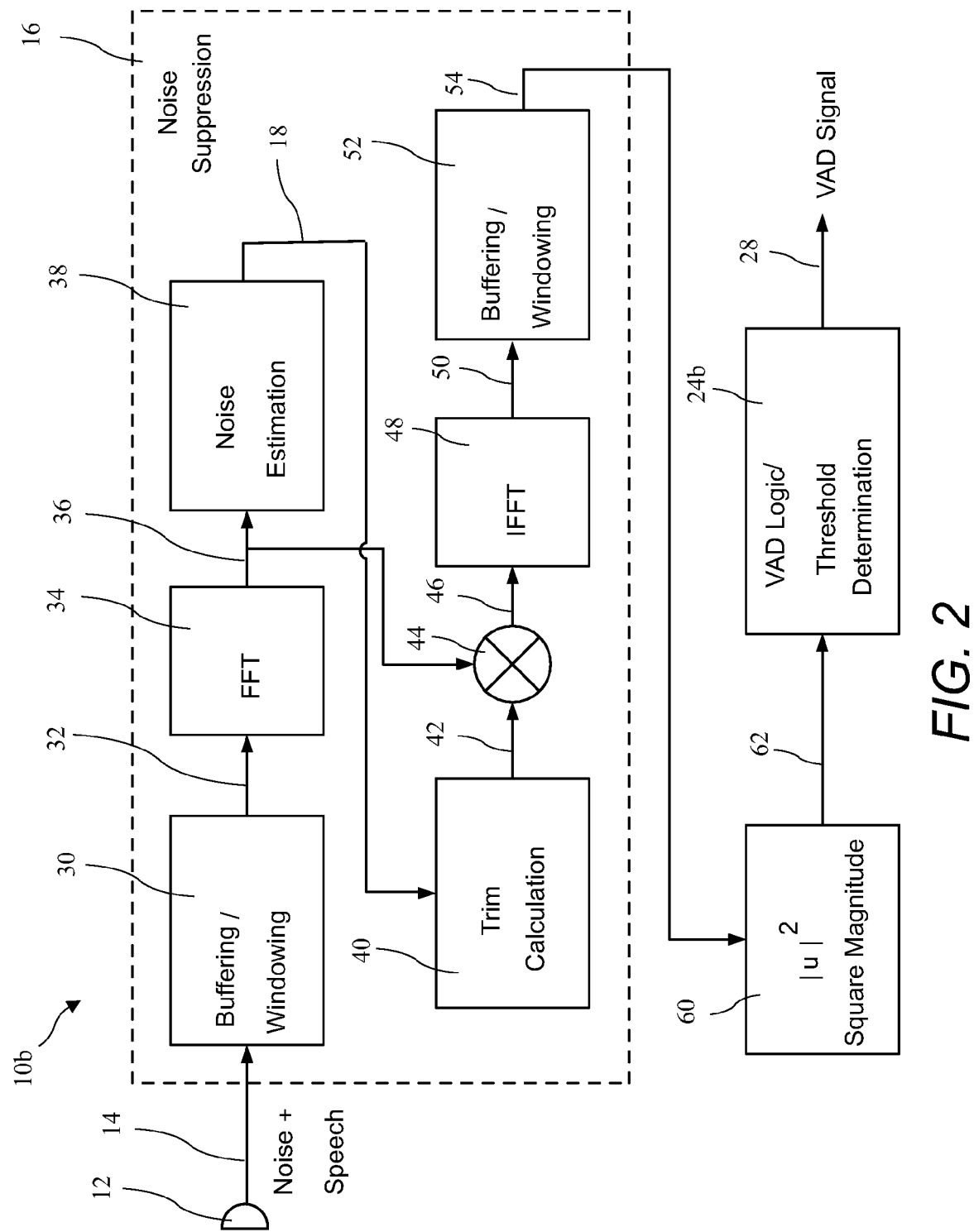
FIG. 2 shows a second embodiment of a VAD method using a threshold based on a smoothed estimate of noise only obtained during non-speech periods, according to the present invention.

A second embodiment of a Voice Activity Detection (VAD) method 10*b* using a threshold based on non-speech periods, according to the present invention is shown in FIG. 2. The second method 10*b* includes the noise suppression 16 described for the first method above. The second method 10*b* departs from the first method 10*a* in not using the ambient noise estimate frames 18 to determine a threshold and instead determines the threshold from the noise suppressed signal 54. The noise suppressed signal 54 is processed by square magnitude 60 to generate a signal energy estimate 62. The signal energy estimate 62 is provided to VAD logic and threshold determination 24*b*.

In contrast to the first method, the VAD decision threshold is determined by the VAD logic and threshold determination 24*b* in terms of the signal energy estimate 62. During non-speech frames, a first order smoother with attack and release time constants is applied to the signal energy estimate 62 in the time domain. The final value of the smoothed output in the most recent non-speech frame, scaled by an appropriate scalar constant, serves as the decision threshold. Typical values of this scalar have been roughly 256, meaning the energy must exceed the calculated noise floor by about 24 dB.

In order to avoid overly sensitive or sporadic behavior, each of the threshold determination methods described in FIGS. 1 and 2 require an additional stage of logic. During an initialization period, the VAD signal 28 is held to 0 (non-speech), regardless of the microphone signal 14. Following the initialization period P, each point in the noise suppressed signal 54 of the noise suppression processing 16 is compared to the threshold. If any one value in a given frame exceeds the threshold, the VAD signal 28 for that frame is 1 (speech). In order for the output to return to 0, the VAD logic requires a number N1 of consecutive frames with no value exceeding the threshold, N1 is preferably about 16. A preferred initialization period P is preferably about 30 frames.

Figure 3:
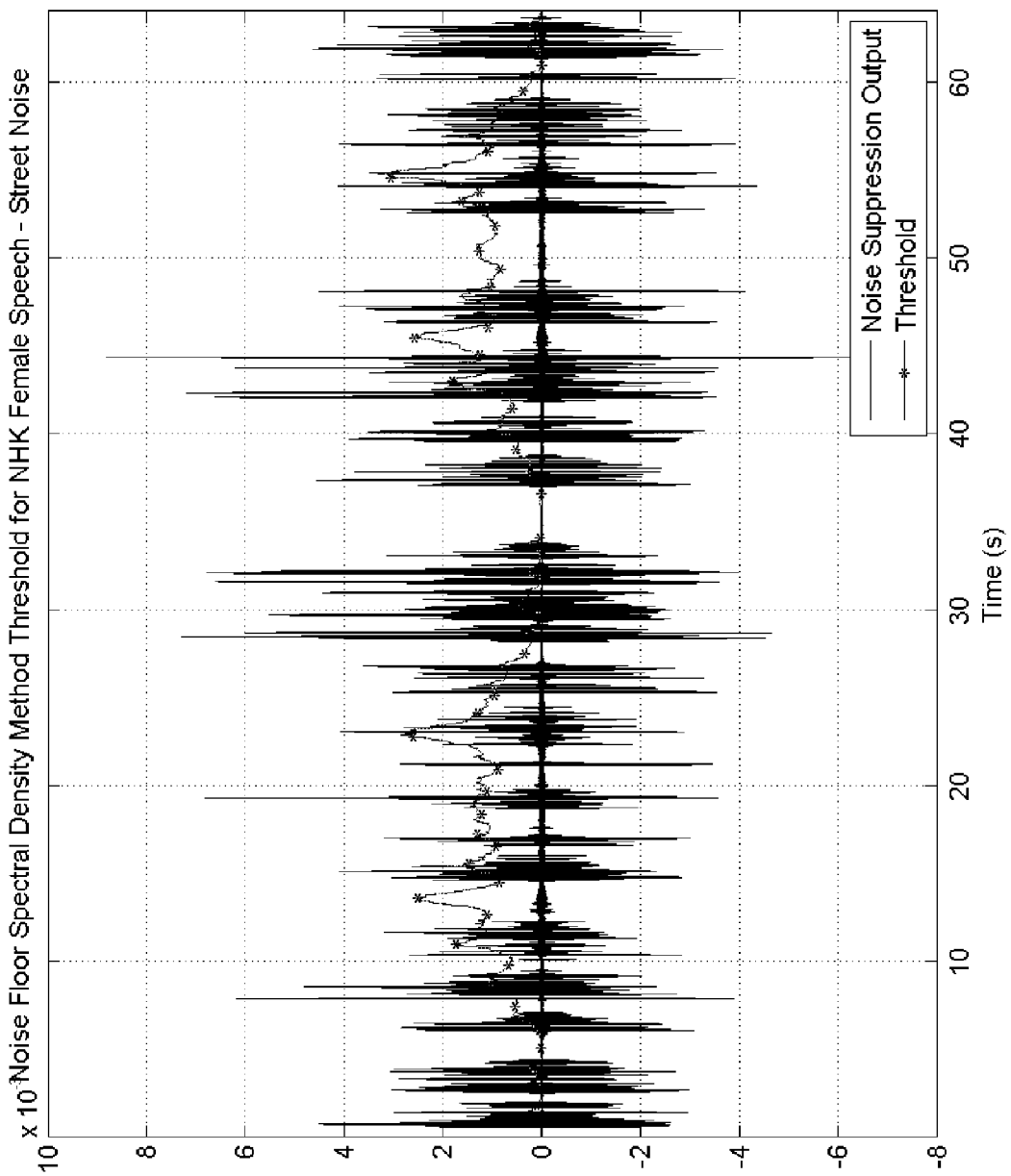
FIG. 3 shows results of the threshold based on noise floor spectral density applied to female speech in the presence of street noise.
Figure 4:
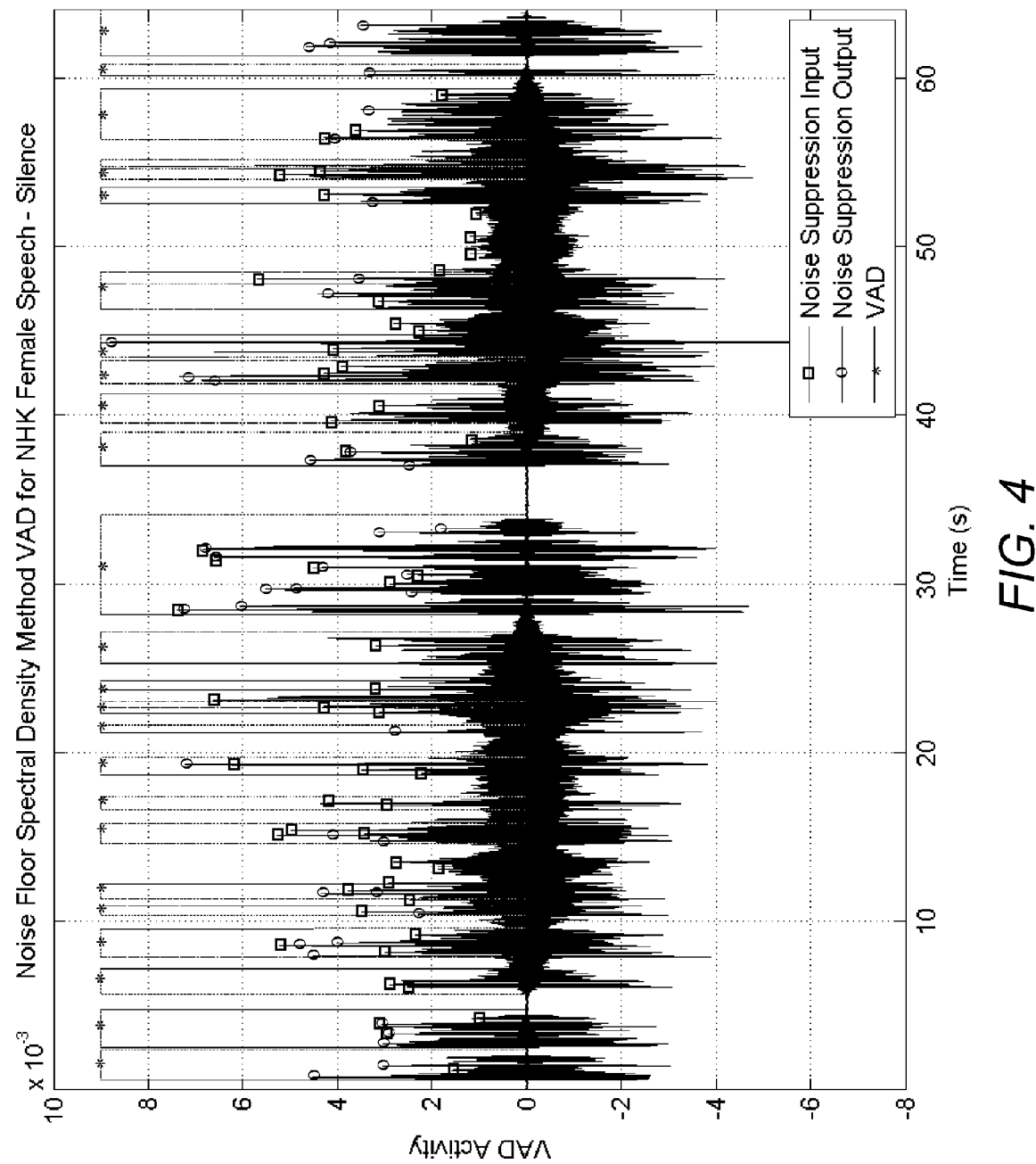
FIG. 4 shows results of the threshold based on noise floor spectral density applied to female speech in the presence of silence.
Figure 5:
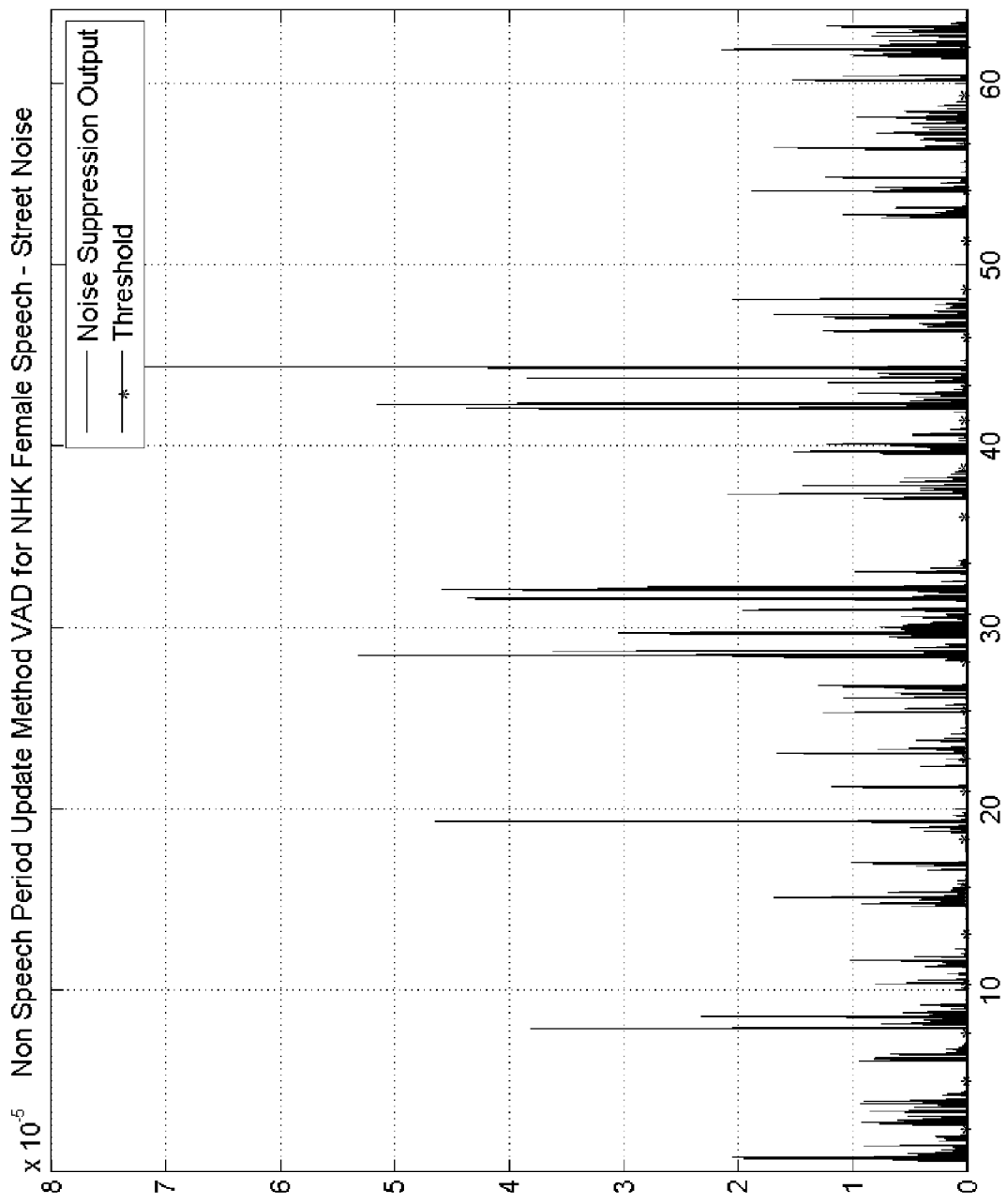
FIG. 5 shows results of the threshold based on non-speech periods applied to female speech in the presence of street noise.
Figure 6:
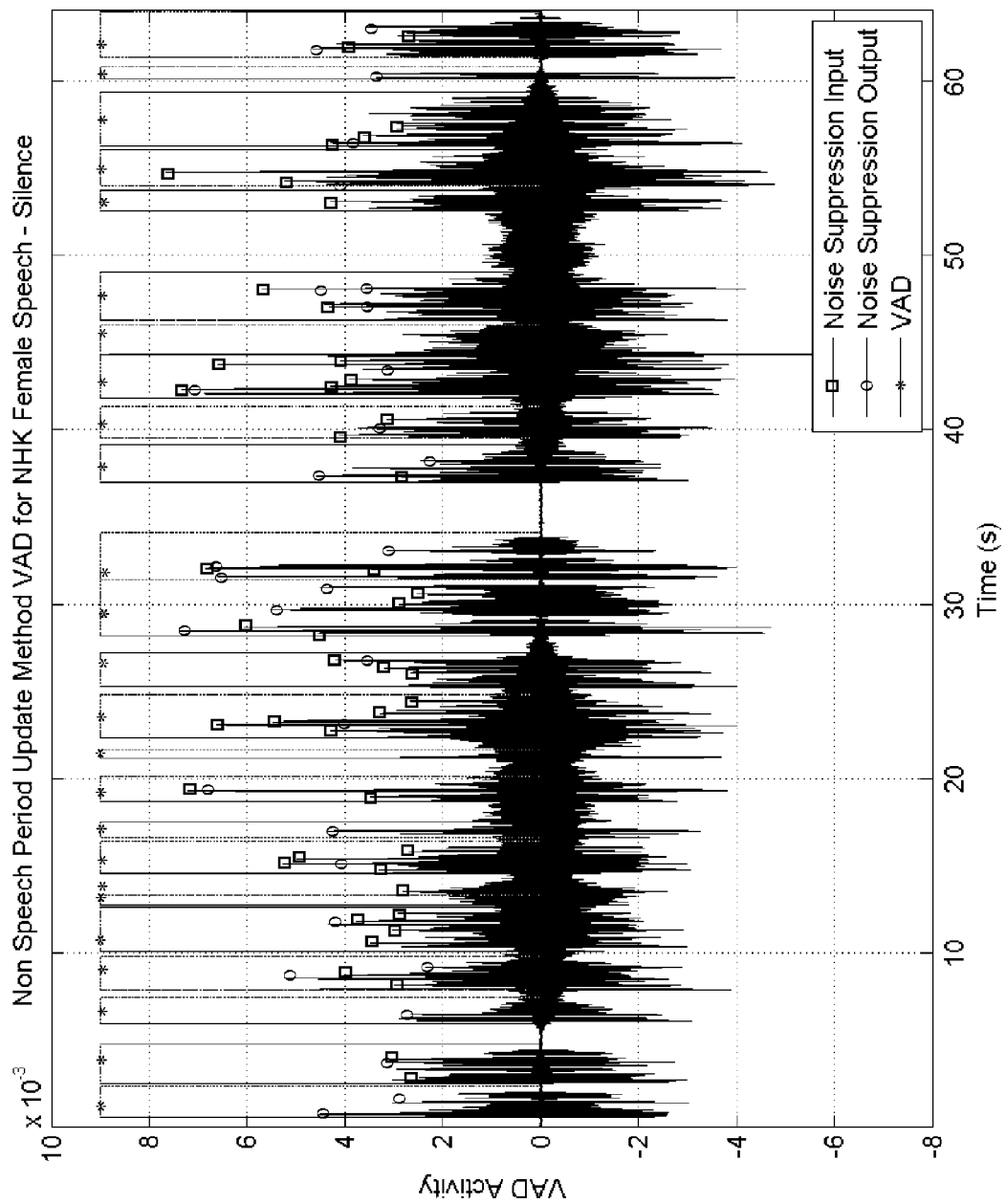
FIG. 6 shows results of the threshold based on non-speech periods applied to female speech in the presence of silence.

FIGS. 3-6 show examples of the present invention applied to female speech. Results of the threshold based on noise floor spectral density applied to female speech in the presence of street noise are shown in FIG. 3. Results of the threshold based on noise floor spectral density applied to female speech in the presence of silence are shown in FIG. 4. Results of the threshold based on non-speech periods applied to female speech in the presence of street noise are shown in FIG. 5. Results of the threshold based on non-speech periods applied to female speech in the presence of silence are shown in FIG. 6.

While the invention herein disclosed has been described by means of specific embodiments and applications thereof, numerous modifications and variations could be made thereto by those skilled in the art without departing from the scope of the invention set forth in the claims.

We claim:

1. A method for Voice Activity Detection (VAD), the method comprising the steps of:
producing a microphone signal including speech and ambient noise by a microphone;
providing the microphone signal to noise suppression processing;
processing the microphone signal in the noise suppression processing to generate an ambient noise estimate, comprising:
buffering and windowing the microphone signal to create time domain frames;
transforming the time domain frames into frequency domain frame; and
computing noise estimates of each of the frequency domain frames;
providing the ambient noise estimate to threshold calculation;
calculating a threshold as the square root and mean of the noise estimates;
provided the threshold to the VAD logic;
computing a noise suppressed signal from the microphone signal and the ambient noise estimate by the noise suppression processing, comprising:
computing trim values from the noise estimates; and
scaling the frequency domain frame by the trim values;
comparing the noise suppressed signal to the threshold in the VAD logic;
setting a VAD signal to 0 when the noise suppressed signal is below the threshold; and
setting a VAD signal to 1 when the noise suppressed signal is above the threshold.

2. The method of claim 1, wherein calculating trims from the frequency domain noise estimate frames includes using over subtraction factor and a noise floor factor to limit the trims.

3. A method for Voice Activity Detection (VAD), the method comprising the steps of:
producing a microphone signal including speech and ambient noise by a microphone;
providing the microphone signal to noise suppression processing;
processing the microphone signal in the noise suppression processing to generate an ambient noise estimate, comprising:
buffering and windowing the microphone signal to create time domain frames:
sequentially transforming the time domain frames into microphone signal frequency domain frames; and computing frequency domain noise estimate frames of each of the microphone signal frequency domain frames;
providing the ambient noise estimate to threshold calculation;
calculating a threshold;
provided the threshold to the VAD logic;
computing a noise suppressed signal from the microphone signal and the ambient noise estimate by the noise suppression processing, comprising:
  calculating trims from the frequency domain noise estimate frames; and
  scaling the microphone signal frequency domain frames using the trims to obtain the noise suppressed signal;
calculating a signal energy estimate as the square of the magnitude of the noise suppressed signal;
comparing the signal energy estimate to a threshold in the VAD logic;
setting a VAD signal to 0 when the signal energy estimate is below the threshold;
setting a VAD signal to 1 when the signal energy estimate is above the threshold.

4. The method of claim 3, wherein comparing the noise suppressed signal to a threshold in the VAD logic comprises comparing the current signal energy estimate to a threshold determined by prior signal energy estimates.

5. The method of claim 4, wherein the threshold is determined by:
during the most recent non-speech frames, setting the threshold to the scaled result of a first order smoother applied to the prior signal energy estimates.

6. The method of claim 5, wherein calculating trims from the frequency domain noise estimate frames includes using over subtraction factor and a noise floor factor to limit the trims.

7. A method for Voice Activity Detection (VAD), the method comprising the steps of:
producing a microphone signal including speech and ambient noise by a microphone;
buffering and windowing the microphone signal to create time domain frames;
sequentially transforming the time domain frames into microphone signal frequency domain frames;
computing frequency domain ambient noise estimate frames of each of the microphone signal frequency domain frames;
providing the frequency domain ambient noise estimate to threshold calculation;
calculating a threshold by taking the square root of each bin of the frequency domain noise estimate frames and then taking the mean of the square roots of each bins;
provided the threshold to the VAD logic;
calculating trims from the frequency domain noise estimate frames;
scaling the microphone signal frequency domain frames using the trims to obtain a frequency domain noise suppressed signal;
inverse transforming the frequency domain noise suppressed signal into a time domain noise suppressed signal;
buffering and windowing the time domain noise suppressed signal;
provided the buffered and windowed time domain noise suppressed signal to the VAD logic;
comparing the buffered and windowed time domain noise suppressed signal to a threshold in the VAD logic;
setting a VAD signal to 0 when the windowed time domain noise suppressed signal is below the threshold; and
setting a VAD signal to 1 when the windowed time domain noise suppressed signal is above the threshold.

8. A method for Voice Activity Detection (VAD), the method comprising the steps of:
producing a microphone signal including speech and ambient noise by a microphone;
buffering and windowing the microphone signal to create time domain frames;
sequentially transforming the time domain frames into microphone signal frequency domain frames;
computing frequency domain noise estimate frames of each of the microphone signal frequency domain frames;
calculating trims from the frequency domain noise estimate frames;
scaling the microphone signal frequency domain frames using the trims to obtain a frequency domain noise suppressed signal;
inverse transforming the frequency domain noise suppressed signal into a time domain noise suppressed signal;
buffering and windowing the time domain noise suppressed signal;
squaring the buffered and windowed time domain noise suppressed signal to generate a signal energy estimate;
determining a threshold using prior signal energy estimate;
comparing the present signal energy estimate to the threshold in the VAD logic;
setting a VAD signal to 0 when the signal energy estimate is below the threshold; and
setting a VAD signal to 1 when the signal energy estimate is above the threshold.

9. The method of Claim 8, wherein the VAD signal is held to "0" during a threshold initialization period.

* * * * *